US012056478B2

(12) United States Patent
Torres et al.

(10) Patent No.: US 12,056,478 B2
(45) Date of Patent: Aug. 6, 2024

(54) APPLICATION HOSTING, MONITORING, AND MANAGEMENT WITHIN A CONTAINER HOSTING ENVIRONMENT

(71) Applicant: Verizon Patent and Licensing Inc., Basking Ridge, NJ (US)

(72) Inventors: Randolph Torres, Clermont, FL (US); Ralph Stagg, Wyle, TX (US); Michael T. Bayne, Wesley Chapel, FL (US); Sutap Chatterjee, Tampa, FL (US); Tri Bui, Rowlett, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 88 days.

(21) Appl. No.: 17/687,353

(22) Filed: Mar. 4, 2022

(65) Prior Publication Data
US 2023/0280996 A1  Sep. 7, 2023

(51) Int. Cl.
*G06F 11/36* (2006.01)
*G06F 8/65* (2018.01)

(52) U.S. Cl.
CPC ..................................... *G06F 8/65* (2013.01)

(58) Field of Classification Search
CPC ............... G06F 9/5077; G06F 11/3409; G06F 11/0793; G06F 8/65; G06F 11/3611; G06F 11/3612; H04L 67/02; H04L 67/34; G06N 7/01; G06Q 10/0631
See application file for complete search history.

(56) References Cited

U.S. PATENT DOCUMENTS

| | | | |
|---|---|---|---|
| 2016/0350173 A1* | 12/2016 | Ahad | H04L 67/02 |
| 2019/0324766 A1* | 10/2019 | Parthasarathy | G06F 11/0793 |
| 2021/0360083 A1* | 11/2021 | Duggal | H04L 67/34 |
| 2021/0377184 A1* | 12/2021 | Singh | G06F 11/3409 |
| 2022/0014963 A1* | 1/2022 | Yeh | G06N 7/01 |
| 2022/0261661 A1* | 8/2022 | Khaligh | G06Q 10/0631 |
| 2023/0004447 A1* | 1/2023 | Seth | G06F 9/5077 |

OTHER PUBLICATIONS

KR 101203224, (translation), Nov. 20, 2012, 32 pgs <KR_101203224.pdf>.*
Zhao et al, CN 113590146 (translation), Nov. 2, 2021, 17pgs < CN_113590146.pdf>.*

* cited by examiner

*Primary Examiner* — Tuan A Vu

(57) ABSTRACT

One or more computing devices, systems, and/or methods for application deployment, monitoring, and management within a container hosting environment are provided. A service collector acquires operational statistics of an application hosted within a container managed by a pod of the container hosting environment. A rule execution engine executes a set of rules to process the operational statistics. In response to the set of rules identifying suboptimal operation of the application, a remedial action is created to address the suboptimal operation of the application. The remedial action is either automatically executed to address the suboptimal operation or is used to generate a recommendation for how to address the suboptimal operation.

20 Claims, 15 Drawing Sheets

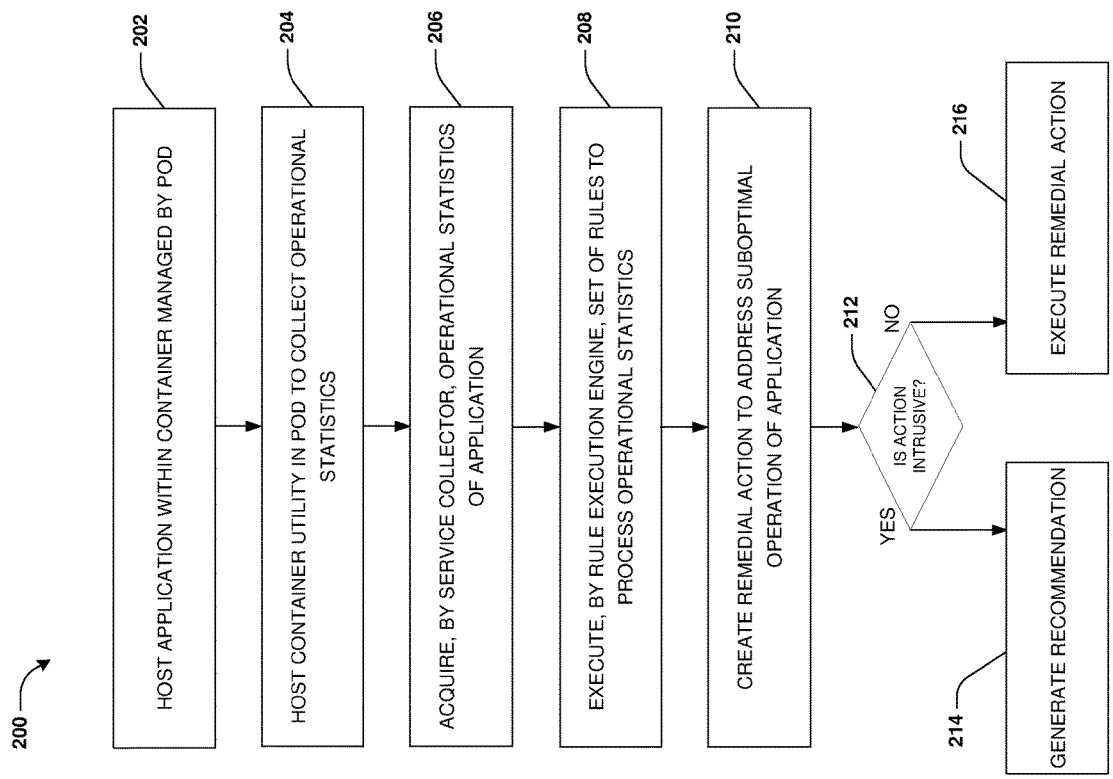

| Timestamp | S0C | S1C | S0U | S1U | EC | EU | OC | OU | Max Capacity | Total Used Memory | Headroom | Headroom % |
|---|---|---|---|---|---|---|---|---|---|---|---|---|
| 430457 | 9536 | 9536 | 23.3 | 0 | 76480 | 28425.7 | 191168 | 26258.5 | 293601280 | 56020480 | 237580800 | 80.92% |
| 430548 | 9536 | 9536 | 23.3 | 0 | 76480 | 42567.7 | 191168 | 26258.5 | 293601280 | 70501888 | 223099392 | 75.99% |
| 430549 | 9536 | 9536 | 23.3 | 0 | 76480 | 57287.5 | 191168 | 26258.5 | 293601280 | 85574963 | 208026317 | 70.85% |
| 430550 | 9536 | 9536 | 23.3 | 0 | 76480 | 73438.3 | 191168 | 26258.5 | 293601280 | 102113382 | 191487898 | 65.22% |
| 430551 | 9536 | 9536 | 0 | 44.8 | 76480 | 13970.6 | 191168 | 26258.9 | 293601280 | 41240888 | 252360392 | 85.95% |

Max(Total Used Memory) = 1021113382
Headroom on Max = 191487898
Headroom % on Max = 65.22%

Threshold = 30% [REMEDIATE]

Target Usage = 80%
Adjustment: Max(TUM) / 80% = 128MiB

S0C - Survivor space 1 capacity (kb)
S1C - Survivor space 2 capacity (kb)
S0U - Survivor space 1 used (kb)
S1U - Survivor space 2 used (kb)
EC - Eden space capacity (kb)
EU - Eden space used (kb)
OC - Old generation capacity (kb)
OU - Old generation used (kb)

1000
```
containers:
- name: foo-bar
  image: 10.1.1.1:8888/new-foobar:a1
  ports:
    - containerPort: 8088
  resources:
    requests:
      cpu: "100m"
      memory: "350Mi"
    limits:
      memory: "350Mi"
...
```

1010
```
containers:
- name: foo-bar
  image: 10.1.1.1:8888/new-foobar:a1
  ports:
    - containerPort: 8088
  resources:
    requests:
      cpu: "100m"
      memory: "128Mi"
    limits:
      memory: "128Mi"
...
```

FIG. 10

APPLICATION HOSTING, MONITORING, AND MANAGEMENT WITHIN A CONTAINER HOSTING ENVIRONMENT

BACKGROUND

Applications have been traditionally designed to execute within operating systems of computing devices, such as desktop computers, laptops, tablets, mobile devices, servers, or other types of computing devices. The operating system may manage the lifecycle of an application executing on a computing device. The operating system may provide the application with access to memory resources, storage resources, processor resources, network resources, and/or other resources of the computing device. The application may have little to no restrictions on resource utilization due to an expectation that resource utilization will be managed by the operating system execution environment, and any resources needed will be made available. Thus, the application may not be designed for optimal resource utilization.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 2 is a flow chart illustrating an example method for application deployment, monitoring, and management within a container hosting environment;

FIG. 10 is an example of operational data collection, rule engine analysis and remedial action;

DETAILED DESCRIPTION OF EXAMPLE EMBODIMENTS

Figure 1:
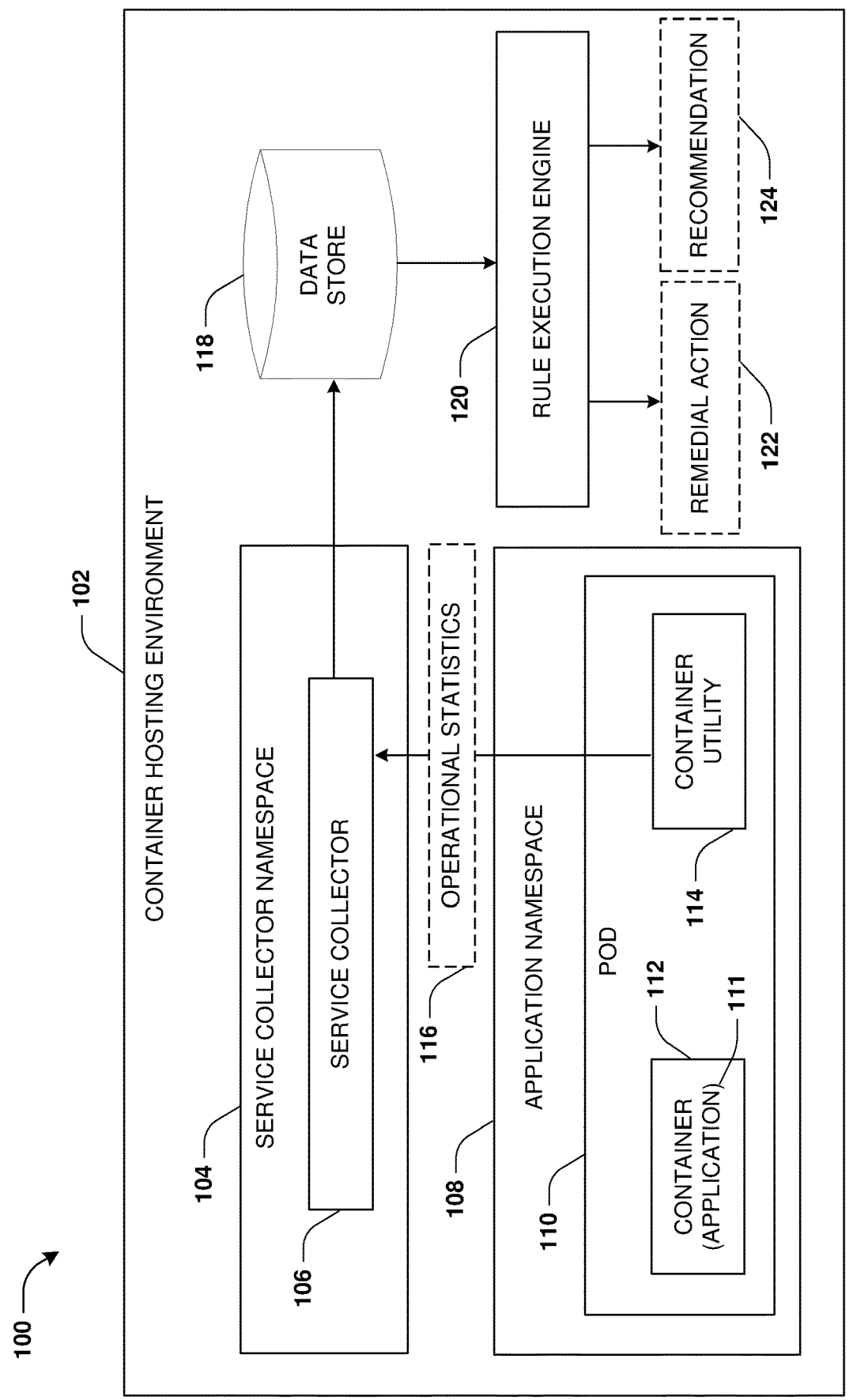
FIG. 1 is a diagram illustrating an example scenario associated with application deployment, monitoring, and management within a container hosting environment.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of computing scenarios in which the disclosed subject matter may be utilized and/or implemented.

One or more systems and/or techniques for application deployment, monitoring, and management within a container hosting environment are provided. Many applications are defined for execution by an operating system of a computing device, such as a data center server, desktop computer, a laptop, a tablet, a mobile device, etc. These applications may utilize CPU, threads, memory, I/O, and/or storage of the computing device during execution. However, the applications may utilizes these resources in suboptimal ways because the applications were designed without expectations of restrictions on resource access and usage. Instead, the applications were designed to expect a high level of resource availability, which would be managed by the operating system computing environment.

It may be useful to transition from hosting these applications (legacy applications) within traditional operating systems to being hosted within a "webscale" or "cloud-scale" hosting environment—such as using containers as execution environments and use management and orchestration systems (e.g., Kubernetes) for execution management—in order to take advantage of the cloud-based and scalable application infrastructure of these environments. Unfortunately, many of these applications are not configured to take advantage of the scalability of the infrastructure provided by the webscale hosting platform. Using a container-based hosting environment as an example, when an application is to be run, a container managed by a pod is deployed using a configuration (e.g., a manifest) defining resource allocations, limits, and/or other parameters relating to the execution of the application. The existing resource allocations, limits, and/or other parameters may not be an efficient allocation for hosting the application, which can result in overprovisioning and/or under provisioning of resources. For example, in a traditional application operating environment, application scalability was generally achieved by overprovisioning resources so that the application could access the additional resources during times of additional demand. In a container-based environment, however, these demand events are typically handled by deploying additional application instances, which reduces the need for such overprovisioning. Additionally, these application may not be designed for fast application startup expected by the containerized infrastructure when new application instances are deployed, which reduces the ability to scale quickly to address demand. Further considerations may include how external communication with other applications are configured, and whether various application artifacts such as files may exceed the processing capabilities of the container hosting platform.

Accordingly, as provided herein, deployment, monitoring, and management of applications (legacy applications) hosted within the container hosting environment 102 is provided, as illustrated by system 100 of FIG. 1. The container hosting environment 102, which may use Kubernetes for its management and orchestration platform, may be configured to host applications within containers managed by pods. For example, a pod 110 may be used to manage one or more containers, such as a container 112 used to host an application 111. A configuration, such as a manifest, may be used to deploy the pod 110 and/or container 112. The configuration may specify resource allocations, limits, and/or parameters for the container 112. For example, the configuration may specify CPU limits, memory limits, a CPU allocation request, memory allocation requests, etc. In this way, the application 111 hosted within the container 112 managed by the pod 110 may be assigned resources based upon the configuration.

In some embodiments, the container hosting environment 102 can deploy containers on nodes (e.g., a virtual machine, physical hardware, etc.) that have allocated compute resources (e.g., processor, memory, etc.) for executing applications hosted within containers. Applications hosted within multiple containers may interact with one another and cooperate together. For example, the application 111 within the container 112 may access another application within other containers managed by the pod 110 in order to access functionality and/or services provided by the other application. The container hosting environment 102 may provide the ability to support these cooperating applications as a grouping managed by the pod 110. This grouping (pod) can support multiple containers and forms a cohesive unit of service for the applications hosted within the containers. Containers that are part of the pod 110 may be co-located and scheduled on a same node, such as the same physical hardware or virtual machine. This allows the containers to share resources and dependencies, communicate with one another, and/or coordinate their lifecycles of how and when the containers are terminated.

In some embodiments, the pod 110 may be used to run and manage containers from the perspective of the container hosting environment 102. The pod 110 may be a smallest deployable unit a computing resources that can be created and managed by the container hosting environment 102. The pod 110 may support multiple containers and forms a cohesive unit of service for the applications hosted within the containers, such as the application 111 hosted within the container 112. That is, the pod 110 provides shared storage, shared network resources, and a specification for how to run the containers grouped within the pod 110. For example, the pod 110 may encapsulate the application 111 composed of multiple co-located containers that share resources. These co-located containers form a single cohesive unit of service provided by the pod 110. The pod 110 wraps these containers, storage resources, and network resources together as single unit that is managed by the container hosting environment 102. In some embodiments, the pod 110 may be hosted within an application namespace 108 of the container hosting environment 102.

Because the application 111 may be a legacy application that was designed for execution by an operating system directly as opposed to being hosted within the container hosting environment 102, the application 111 may not be designed to efficiently utilize resources provided by the container hosting environment 102 to the pod 110. This can lead to overprovisioning of resources that the application 111 never uses and/or under provisioning of resources such that the application 111 experiences degraded performance. Accordingly, a container utility 114 (e.g., a utility implemented through a "sidecar," a script, a procps package, or other utility capable of obtaining operational statistics of various types of applications) may be injected into the pod 110 for tracking operational statistics 116 of the application 111, such as resource consumption by the application 111 in relation to resource allocations and limits applied to the container 112 for the application 111 during deployment of the pod 110 and/or the container 112 using the configuration (e.g., the manifest). The container utility 114 provides the operational statistics 116 to a service collector 106 hosted within a service collector namespace 104 of the container hosting environment 102. The service collector 106 may collect and/or aggregate the operational statistics 116 provided by various instances of the container utility 114 monitoring applications hosted within containers managed by pods of the container hosting environment 102. The operational statistics 116 and/or aggregation of operational statistics collected from the various instances of the container utility 114 may be stored by the service collector 106 into a data store 118.

A rule execution engine 120 may be configured to retrieve operational statistics from the data store 118. The rule execution engine 120 may execute a set of rules to process the operational statistics 116 in order to identify suboptimal operation of the application 111. In some embodiments, the suboptimal operation of the application 111 may correspond to the application 111 using less resources than what was allocated to the pod 110 for executing the application through the container 112. This may be indicative of overprovisioning of resources, which results in wasted resources which could be allocated to accommodate other containers/pods or allow for reduction in related operational parameters such as power usage. Accordingly, the rule execution engine 120 may identify a remedial action that may be implemented to address the suboptimal operation. In some embodiments, the remedial action may define new resource allocations and resource limits to use for re-deploying the pod 110 in order to re-host the application 111.

If the remedial action 122 can be automatically executed in a non-intrusive manner that does not interfere with clients accessing and using the application 111 (e.g., the application 111 is not currently processing a request from a client device for a service provided by the application 111), then the remedial action may be automatically executed. The remedial action 122 may be used to modify the configuration (e.g., modify the manifest) for the application to create a modified configuration with the new resource allocations and resource limits. The modified configuration may be used to re-deploy the pod 110 for re-hosting the application 111 through a new instance of the container 112 hosted by the re-deployed pod 110. If the remedial action 122 cannot be automatically executed (e.g., the application 111 is currently processing a request from a client device), then a recommendation 124 to implement the remedial action 122 may be generated. The recommendation 124 may be provided to a device for subsequent implementation.

Figure 3A:
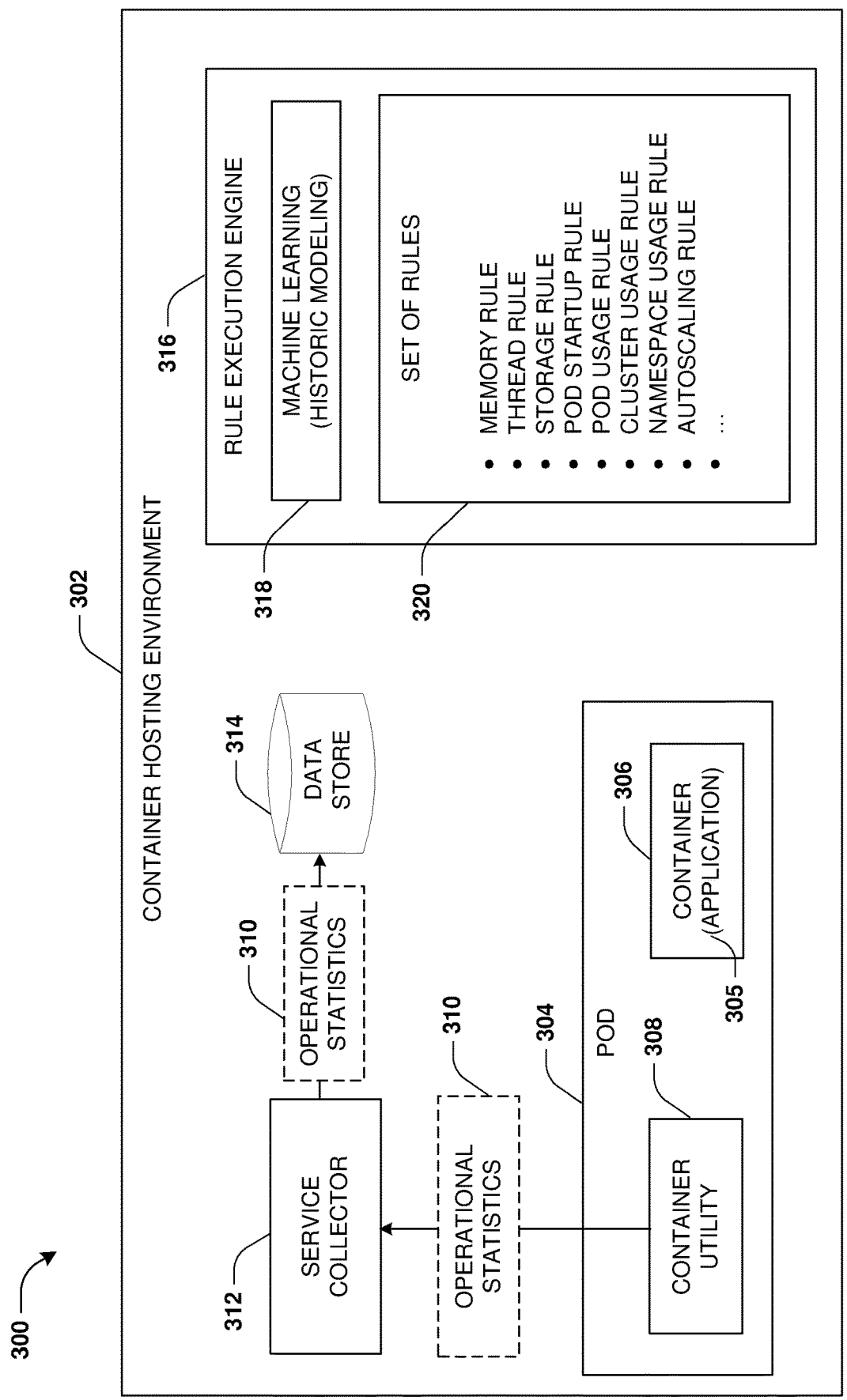
FIG. 3A is a diagram illustrating an example scenario associated with application deployment, monitoring, and management within a container hosting environment.

FIG. 2 illustrates an example of a method 200 for application deployment, monitoring, and management within a cloud-scale hosting environment (such as a container hosting environment), which is further described in conjunction with FIGS. 3A-3B and 4A-4E. A pod 304 may be deployed within a container hosting environment 302 for managing a container 306 (and/or other containers not illustrated) within which an application 305 (e.g., a legacy application such as a Java application) is hosted, as illustrated by FIG. 3A. In this way, the application 305 may be hosted within the container 306 managed by the pod 304 of the container hosting environment 302, during operation 202 of method 200. A container utility 308 may be injected into and hosted within the pod 304, during operation 204 of method 200. In some embodiments, the container utility 308 may be implemented as a sidecar, which may be hosted within a container managed by the pod 304. Injection may be by the operation of an injection toolset associated with the orchestration system (e.g. Kubernetes).

The container utility 308 may be configured to collect operational statistics 310 of the application 305 executing within the container 306. The operational statistics 310 may correspond to memory usage, CPU usage, storage usage, IOPS (I/O throughput), thread usage, and/or a variety of other statistics relating to execution of the application 305. In some embodiments, the container utility 308 may execute monitoring functions, such as jstack used to output Java stack traces, jmap used to output shared object memory maps or heap memory details, jstat to obtain performance statistics such as garbage collection or compilation activities, and/or other monitoring functions in order to observe operation of the application 305. It may be appreciated that any type of tool capable of tracking operational statistics associated with execution of any type of application (e.g., C programming based applications, C++ programming based applications, Java applications, JVMs, Python applications, GoLang applications, etc.) may be hosted as part of the container utility 308. In some embodiments, the container utility 308 may be configured with functionality to detect the type of application 305 deployed within the container 306. Based upon the type of application, the container utility 502 may selectively utilize a particular script, procps package, Java tools (e.g., jstack, jmap, jstat, etc.), or other monitoring functions that are capable of tracking operational statistics for that type of application.

During operation 206 of method 200, a service collector 312 may be configured to acquire the operational statistics 310 collected by the container utility 308. For example, the service collector 312 may provide an interface (e.g., an API) that is used by the container utility 308 to communicate with service collector 312. In some embodiments, the service collector 312 may periodically poll the container utility 308 for the operational statistics 310. In some embodiments, the container utility 308 may push the operational statistics 310 to the service collector 312. The service collector 312 may obtain configurations (deployment manifests and configuration data) for the pod 304 and/or other pods deployed within the container hosting environment 302. The service collector 312 may store the operational statistics 310 and/or the configurations within a data store 314 accessible to a rule execution engine 316.

The rule execution engine 316 may be configured to utilize a machine learning functionality 318, historical operational statistics modeling functionality, predictive analysis, trend analysis, and/or other functionality to process the operational statistics 310 and configurations stored within the data store 314 utilizing a set of rules 320. The rule execution engine 316 may evaluate such information to determine if the pod 304 and/or the other pods deployed within the container hosting environment 302 are operating optimally. In some embodiments, this may be accomplished by utilizing machine learning functionality 318 that can detected patterns that may be predictive of suboptimal (degraded) performance and/or failure of the pod 304, the container 306, and/or the application 305. If the rule execution engine 316 detects degraded performance or a misconfiguration, then an orchestrator of the container hosting environment 302 may be instructed to re-deploy the pod 304 with updated resource parameters (e.g., a new memory allocation, a new memory limit, a new CPU allocation, a new CPU limit, a new thread allocation, a new thread limit, etc.), which may be specified through a modified configuration created by the rule execution engine 316 for the application 305/pod 304.

In some embodiments, the rule execution engine 316 may utilize the set of rules 320 to evaluate the operational statistics 310 and configurations to detect the degraded performance or a misconfiguration. The set of rules 320 may comprise a memory rule/model, a thread rule/model, a storage rule/model, a pod startup rule/model, a pod usage rule/model, a cluster usage rule/model, a namespace usage rule/model, an autoscaling rule/model (e.g., autoscaling performed by a vertical pod autoscaler of the container hosting environment to scale resource allocation up to down for the pod 304).

In some embodiments, the rule execution engine 316 may expose a user interface or API that allows a user to view the operational statistics 310 (monitoring data) and deployment data of the pod 304 (e.g., the deployment manifest and/or other configuration data) and/or of the other pods being monitored. Thus, if the pod 304 requires manual optimization by the user, then the user can utilize the user interface or API to input new resource parameters and/or resource limits that can be used for updating the configuration to create the modified configuration. This may be used as input to the machine learning functionality 318 for performing predictive monitoring of pod performance.

During operation 208 of method 200, the rule execution engine 316 may execute the set of rules 320 to process the operational statistics 310 and/or configuration of the pod 304 to identify suboptimal operation of the application 305. In some embodiments, the memory rule/model may be used to evaluate memory utilization by the application 305. The thread rule/model may be used to evaluate thread utilization and allocation by the application 305. The storage rule/ model may be used to evaluate storage utilization and allocation by the application 305. The pod startup rule/ model may be used to evaluate operational parameters of the pod 304. The cluster usage rule/model may be used to evaluate cluster usage by the application 305, container 306, and/or pod 304. The namespace usage/model may be used to evaluate application namespace utilization of pods hosted within an application namespace. The autoscaling rule/ model may be used to evaluate how a vertical pod autoscaler scales up or down resources allocated to the pod 304.

In some embodiments, the suboptimal operation may relate to a misconfiguration of the pod 304 and/or degraded performance of the application 305. In some embodiments, the rules/models may be used to identify a difference (head room) between an amount of resources allocated and an amount of resources consumed. If the difference (head room) exceeds a threshold amount (e.g., head room of 30% or more), then suboptimal operation may be detected based upon an overprovisioning of resources that are going unused and are thus wasted. In some embodiments, the suboptimal operation may relate to unused memory resources, unused thread resources, and/or unused CPU resources allocated to the pod 304 but not utilized by the application 305. Such resources may be overprovisioned and thus wasted.

During operation 210 of method 200, a remedial action may be created to address the suboptimal operation of the application 305. In some embodiments, the remedial action may be determined by the machine learning functionality 318 utilizing predictive analysis of predictive performance given certain resource allocations, historic trend analysis of operational statistics collected over time, pattern recognition, etc. The remedial action may correspond to new resource allocations and resource limits to apply to the pod 304, the container 306, and/or the application 305. The remedial action may correspond to code modifications for the application 305. The remedial action may corresponding to modifications to an application namespace used to host the pod 304.

During operation 212 of method 200, an impact of automatically implementing the remedial action may be evaluated to determine whether executing the remedial action would be intrusive to clients. For example, if the remedial action is to terminate the pod 304 (thus terminating the container 306 and application 305) and re-deploy a new instance of the pod 304 for re-hosting the application 305 with different resource allocations and resource limits, then the remedial action would be intrusive if the application 305 is currently being access by a client such as where the application 305 is processing a request from the client for a service provided by the application 305 (e.g., current operational statistics measured by the container utility 308 may be indicative of typical resource consumption of the application 305 processing a request from a client).

Figure 3B:
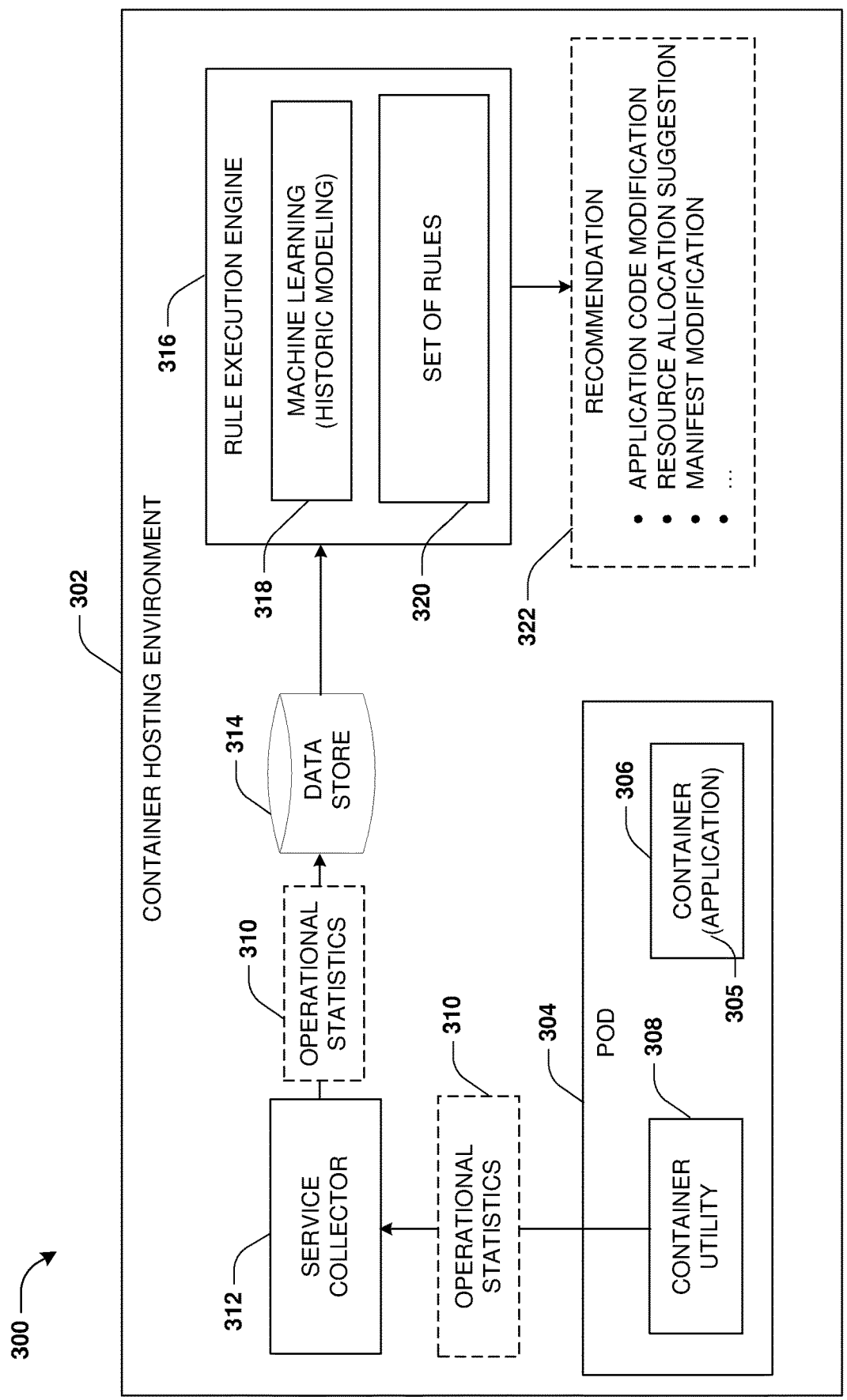
FIG. 3B is a diagram illustrating an example scenario associated with application deployment, monitoring, and management within a container hosting environment, where a recommendation is generated.

If execution of the remedial action would be intrusive, then a recommendation 322 is generated, during operation 214 of method 200. The recommendation 322 may recommend application code modifications to improve resource consumption efficiency of the application 305, a resource allocation suggestion, a resource limit suggestion, a configuration/manifest modification, and/or other recommended actions to take to address the suboptimal performance of the application 305, as illustrated by FIG. 3B. In some embodiments, the recommendation 322 may recommend various actions to take in order to improve the suboptimal operation of the application 305 such as to allocate an amount of resources that are more closely aligned to resource consumption by the application 305 to address resource overprovisioning (e.g., a resource allocation adjustment to modify a head room of unused memory resources to below 30%). In some embodiments, the recommendation 322 may be generated using historic trend analysis as a recommendation for the container 306, an application namespace within which the pod 304 is hosted, and/or a cluster of nodes hosting the pod 304 and/or other pods not illustrated. In some embodiments, the recommendation 322 may relate to refactoring resource consumption and allocation of the application 305 to address the suboptimal operation of the application 305. The recommendation 322 may be stored and/or transmitted to a device for subsequent performance of actions defined within the recommendation 322.

Figure 4A:
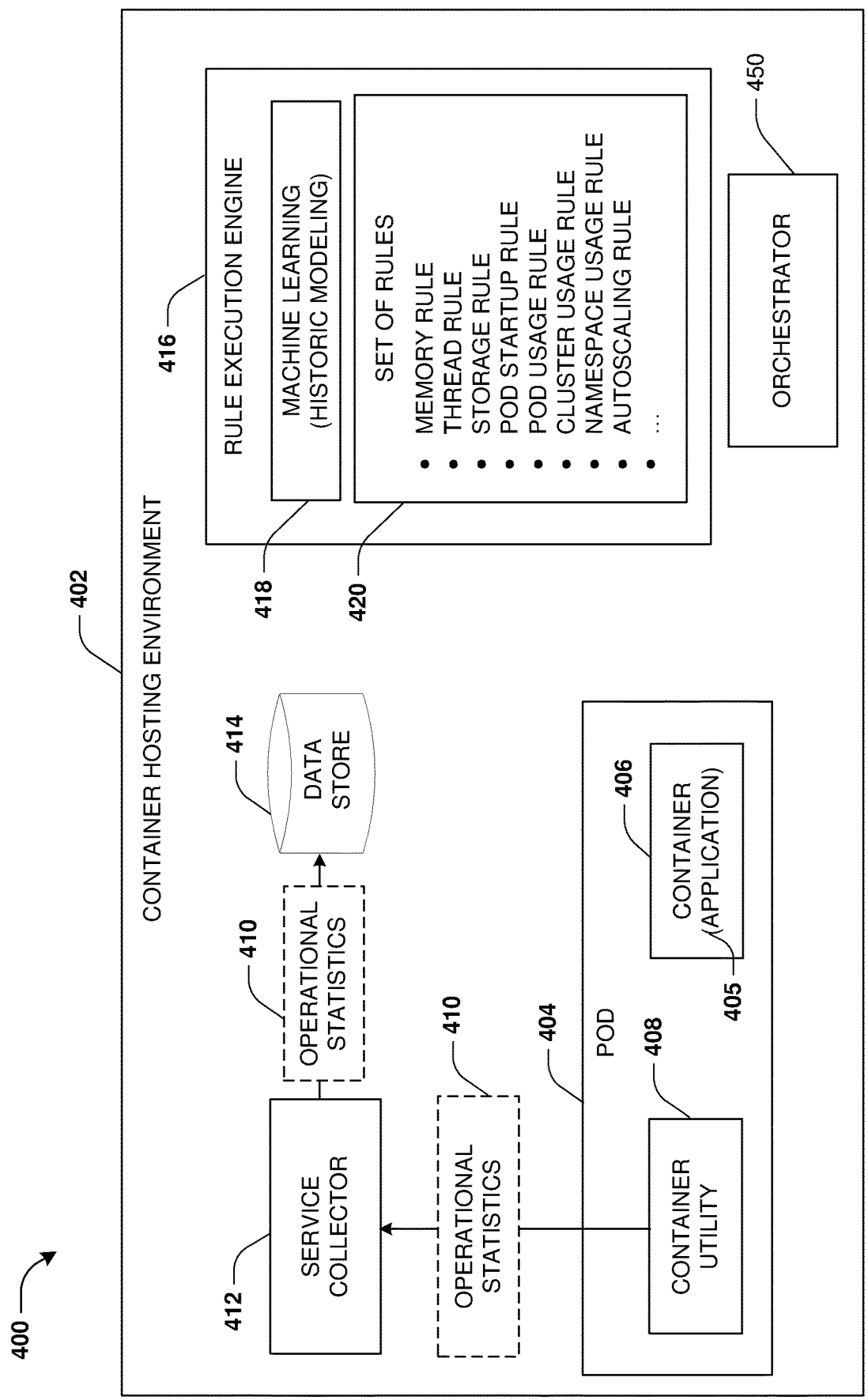
FIG. 4A is a diagram illustrating an example scenario associated with application deployment, monitoring, and management within a container hosting environment.

If execution of the remedial action would not be intrusive, then the remedial action may be automatically executed without manual intervention, during operation 216 of method 200. FIGS. 4A-4E illustrate an example of automatically executing a remedial action. In particular, a pod 404 may be deployed within a container hosting environment 402 by an orchestration system 450 to manage a container 406 hosting an application 405, as illustrated by FIG. 4A. A container utility 408 injected into the pod 404 may collect and provide operational statistics 410 of the application 405 to a service collector 412 that stores the operational statistics 410 and a configuration of the pod 404 (a deployment manifest) within a data store 414 accessible to a rule execution engine 416. The rule execution engine 416 may utilize machine learning functionality 418, historic modeling, predictive analysis, pattern recognition, and/or a set of rules 420 to evaluate the operational statistics 410 and the configuration of the pod 404 to detect suboptimal performance of the application 405 and/or to construct/select a remedial action to perform to address the suboptimal performance.

Figure 4B:
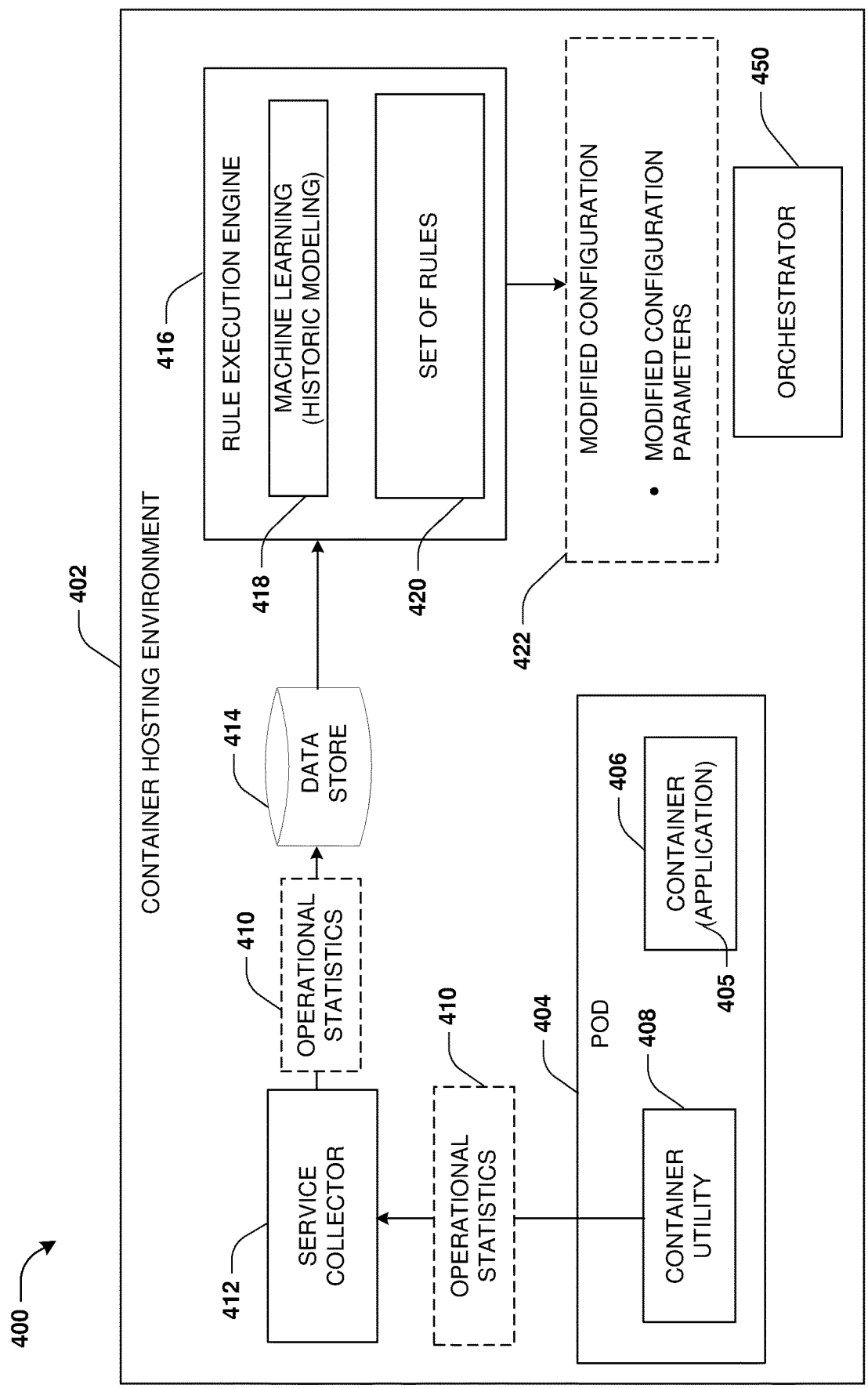
FIG. 4B is a diagram illustrating an example scenario associated with application deployment, monitoring, and management within a container hosting environment, where a remedial action to modify a configuration is executed.

If execution of the remedial action would not be intrusive to clients (e.g., the application 405 is not currently processing a request from a client and is idle, or execution of the remedial action would not unduly hinder the application 405 from continuing to process a request from a client in order to satisfy a service level agreement of the client), then the rule execution engine 416 may automatically execute the remedial action. In some embodiments, the remedial action may be executed to modify the configuration of the pod 404 to create a modified configuration 422 with modified configuration parameters, such as modified resource allocations and/or modified resource limits for the pod 404, as illustrated by FIG. 4B. In some embodiments, the remedial action may be implemented to modify a cluster configuration of a cluster of nodes hosting the pod 404, a namespace configuration of an application namespace hosting the pod 404, a container configuration of the container 406, etc.

Figure 4C:
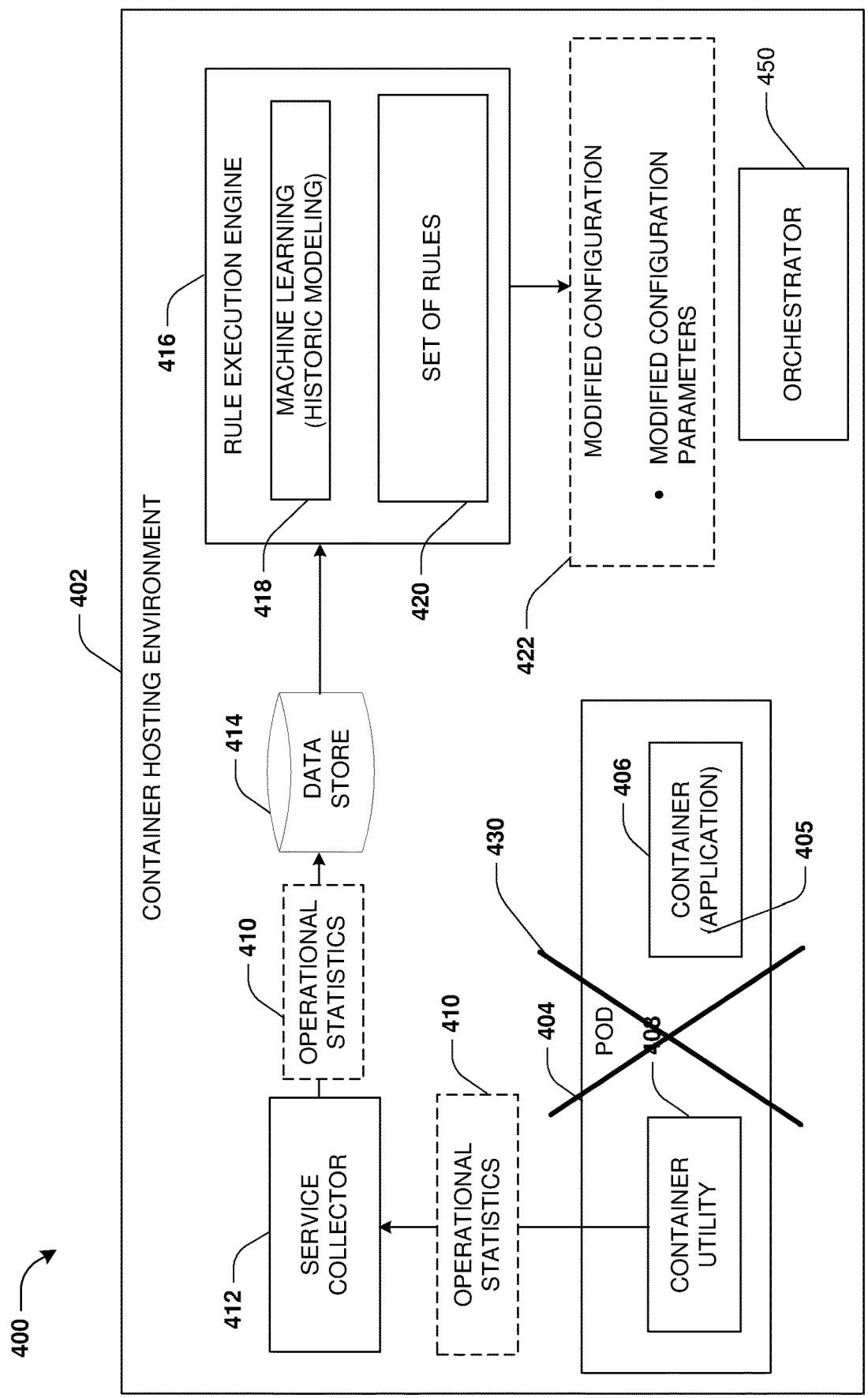
FIG. 4C is a diagram illustrating an example scenario associated with application deployment, monitoring, and management within a container hosting environment, where a pod is removed from the container hosting environment.
Figure 4D:
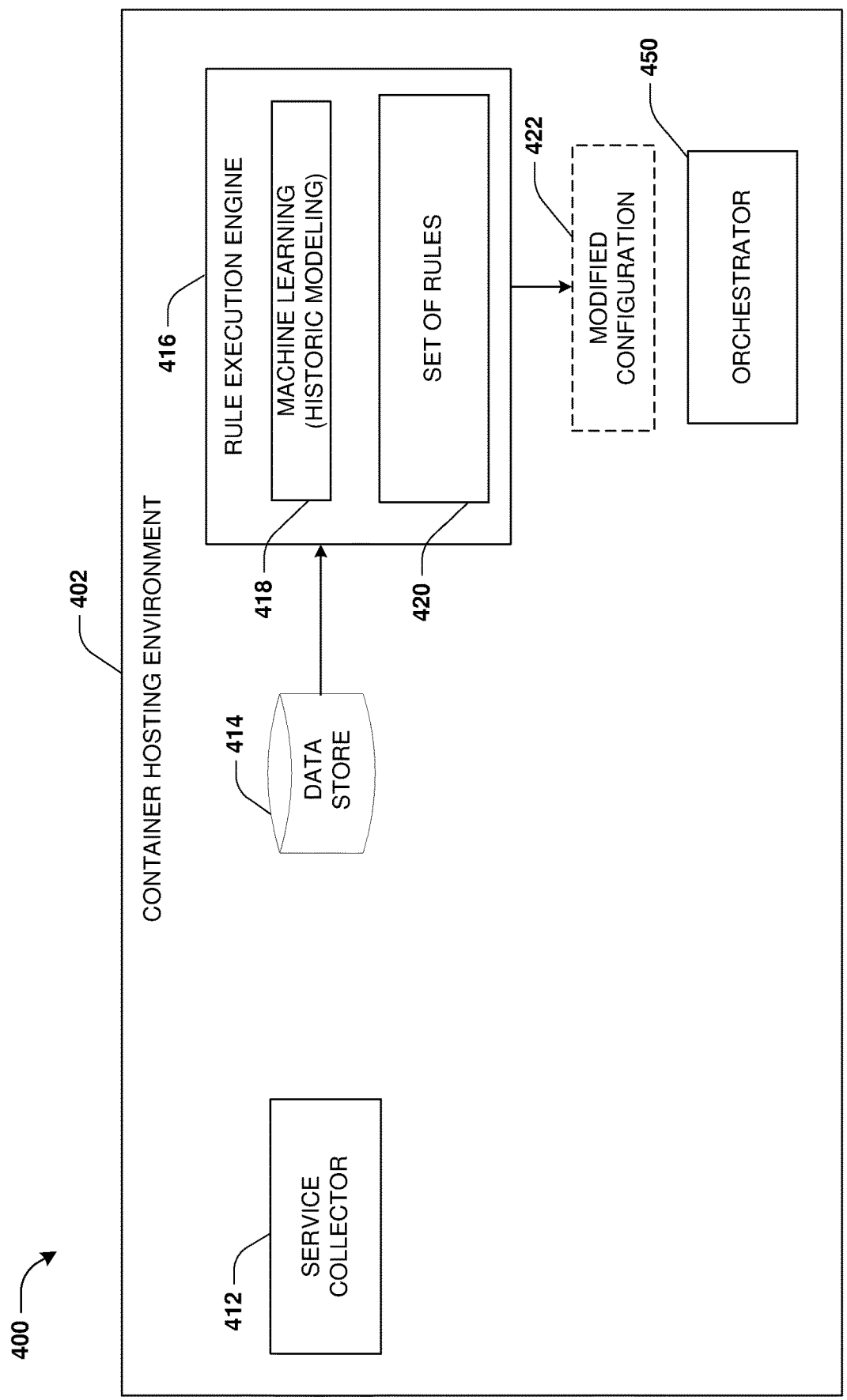
FIG. 4D is a diagram illustrating an example scenario associated with application deployment, monitoring, and management within a container hosting environment.
Figure 4E:
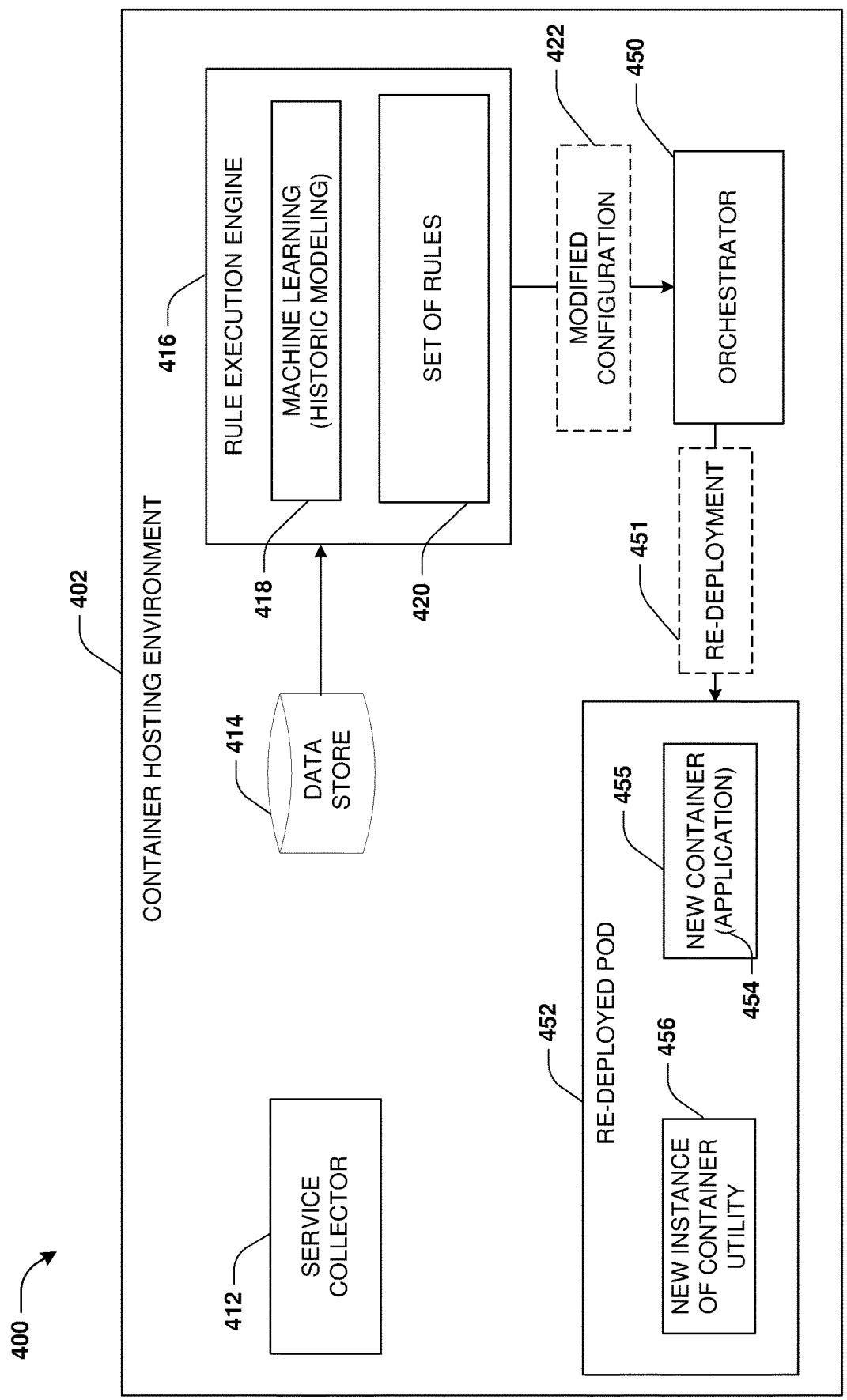
FIG. 4E is a diagram illustrating an example scenario associated with application deployment, monitoring, and management within a container hosting environment, where a pod is re-deployed.

As part of executing the remedial action, an orchestrator 450 of the container hosting environment 402 may be instructed to re-deploy 451 the container 406 using the modified configuration 422. Accordingly, the orchestrator 450 may instruct the container hosting environment 402 to terminate 430 the pod 404, container 406, and application 405, as illustrated by FIG. 4C. This removes the pod 404, the container 406, and the application 405 from the container hosting environment 402, as illustrated by FIG. 4D. The orchestrator 450 may take the modified configuration 422 as input for re-deploying 451 the pod 404 that was terminated from the container hosting environment 402, as illustrated by FIG. 4E. Accordingly, the orchestrator 450 may re-deploy the pod 404 as a re-deployed pod 452. The re-deployed pod 452 may have resources allocated to the pod 452 for use by a new container 455 within the re-deployed pod 452 for re-hosting the application 404 as a re-hosted application 454. The resources (e.g., memory resources, disk resources, thread resources, processor resources, etc.) allocated to the re-deployed pod 452 may be derived from resource allocation parameters within the modified configuration 422. The re-deployed pod 452 may have resource limits (e.g., memory resource limits, disk resource limits, thread resource limits, processor resource limits, etc.) enforced upon the re-deployed pod 452 for re-hosting the application 404 as the re-hosted application 454. The resource limits may be derived from resource limit parameters within the modified configuration 422. A new instance 456 of the container utility may be created for monitoring performance of the re-hosted application 454.

Execution of the remedial action may be monitored to determine if execution of the remedial action succeeded or failed. If execution of the remedial action failed, then retry logic may be implemented to retry execution of the remedial action. The retry logic may remove any pod, container, or application instance that was created by the failed remedial action. In this way, the retry logic ensures that there is no artifacts leftover from the failed remedial action. After, the remedial action may be re-executed by the retry logic. After re-deployment 451 of the re-deployed pod 452, performance of the re-hosted application 454 may be tracked. If degraded performance of the re-hosted application 454 is detected, then the modified configuration 422 may be further modified and used to again re-deploy the pod for re-hosting the application. In some embodiments, this may be implemented as part of a roll back mechanism where the modified configuration 422 is reverted back to a prior state for subsequent re-deployment of the pod.

Figure 5:
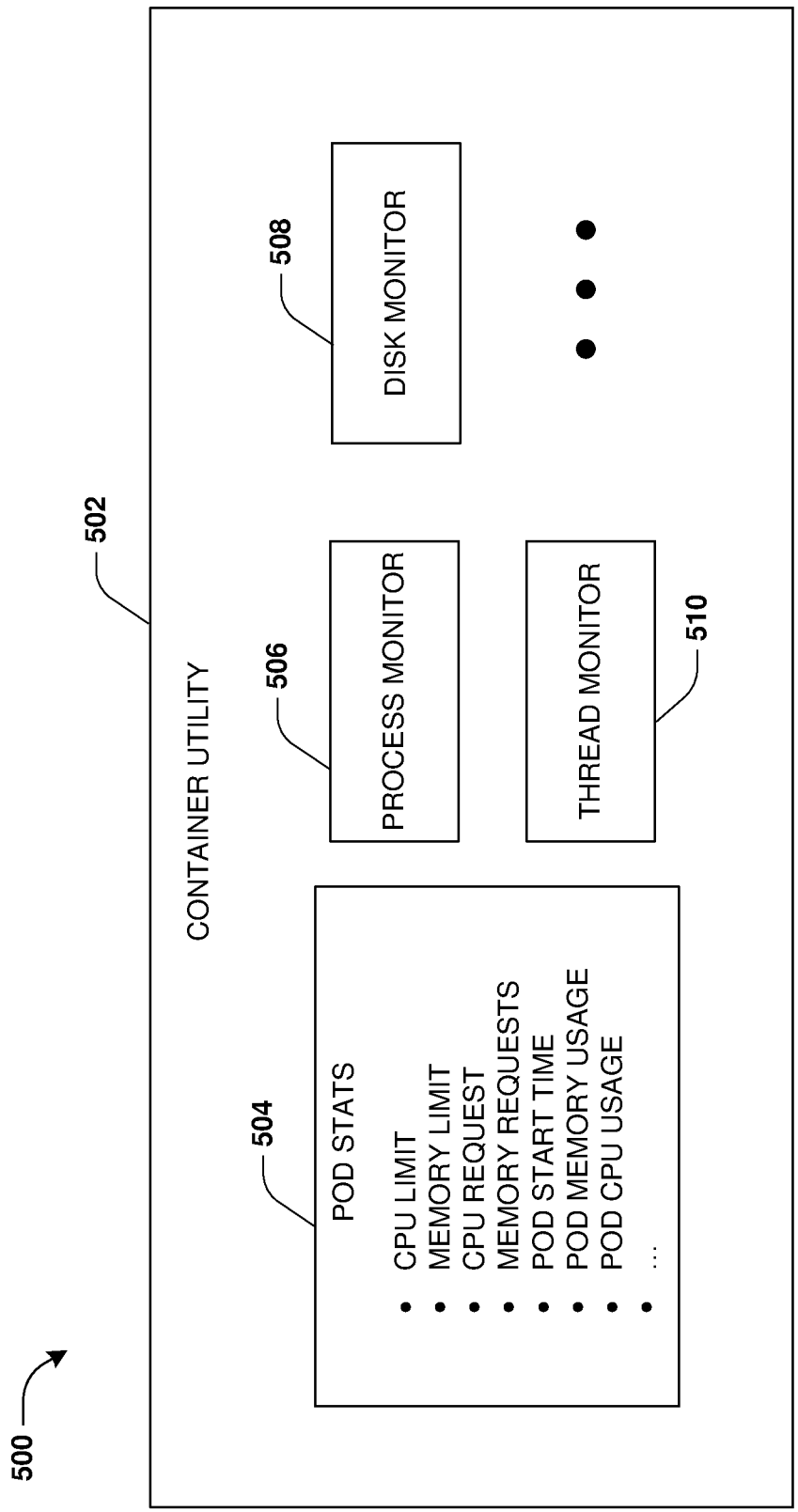
FIG. 5 is a diagram illustrating an example scenario associated with a container utility for monitoring an application hosted by a container hosting environment.

FIG. 5 illustrates an example of a container utility 502. The container utility 502 may implement a number of monitoring facilities to collect data from an application executing within another container in the pod. In this example, a process monitor 506 is provided to monitor processing of an application hosted within a container hosting environment. The container utility 502 may also implement a disk monitor 508 to monitor disk access by the application. The container utility 502 may also implement a thread monitor 510 to monitor thread utilization by the application. The container utility 502 may also include a pod monitor to track pod statistics 504 of the pod managing the container within which the application is hosted. The pod statistics 504 may correspond to CPU limits for the pod, memory limits for the pod, CPU requests by the pod, memory requests by the pod, a pod start time of the pod, pod memory usage, pod CPU usage, and/or other statistics. The operational data may be stored in a data store local to the container utility 502, and a facility executing as part of the container utility 502 may periodically provide the operation data to a service collector (as described above). In some embodiments, the container utility 502 may be preconfigured when injected into a pod to identify and monitor an application hosted within a container of that same pod. In some embodiments, the container utility 308 may be configured to evaluate a deployment manifest of the pod to discover containers and applications hosted by the containers to monitor.

The container utility 502 may be implemented to accommodate monitored applications having different characteristics. For example, a container utility 502 may be used to monitor Java applications using certain tooling, and monitor C applications, GoLang applications, etc. using similar (or different) tooling. In each of these situations, the container utility 502 may provide operational data to the service collector using a consistent interface, which can avoid duplication of infrastructure by using common service collectors, data stores and rules engines.

In some embodiments, the container utility 502 may implement an analysis to determine an application's usage of system memory capacity. As an example, the jstat monitor can be used to analyze the usage by Java applications of system memory as they execute in the Java Virtual Machine (JVM). Memory usage is typically tied to object creation and destruction, a process referred to as garbage collection. An object space within a container hosting environment may be where new objects are created. When the object space is full, then an initial garbage collection process is run. If the initial garbage collection process determines that an object has no reference to the object, then the object is deleted. Otherwise, the object survives and is moved to a survivor space. In some embodiments, merely a single survivor space is implemented, and all objects from other spaces are copied to this survivor space. If the object services a number of back-and-forth copying operations, then the object is moved to an old space. If the old space is full, then, a full garbage collection process is performed, which affects all objects within a container that are managed through the JVM, which in this case would be the application executing within the container hosting environment. There may also be a permanent space where metadata (e.g., class, descriptors, fields, methods, etc.) are stored.

The memory usage analysis may be executed to track operational statistics of the application and objects of the application, such as a timestamp of when the virtual machine was started, survivor space capacity, survivor space usage, object space capacity, object space usage, old generation (old space) capacity, old generation used, metadata space (permanent space) capacity, metadata space used, a number of garbage collections performed to the object space, a young garbage collection total time, a number of full garbage collections, a total time of full garbage collections, a garbage collection total time spent, etc. The memory analysis may utilize this information to derive resource capacity and percentage of resources used, such as max capacity, total used memory, head room, a head room percentage. The values can be calculated, for example, according to the following:

max capacity=sum(survivor space capacities+object space capacity+old generation capacity)*1024 total used memory=sum(survivor space used+object space used+old generation used)*1024 head room=max capacity−total used memory head room %=head room/max capacity*100

The collected and calculated statistics may then be used by the rules execution engine to determine if remedial action is needed, as further described below.

Other types of analyses may be performed by the container utility, such as CPU usage analysis, Input/Output (I/O) usage analysis, and the like. Such monitoring may be performed by scripts, procps packages, or other tools capable of monitoring operational statistics of various types of applications. In some embodiments, the container utility 502 may monitor services (applications) under load and collect the operational statistics such as max heap capacity, heap used over time, and thread count. The collected and calculated statistics from these analyses may be used by the rules execution engine to determine if remedial action is needed, as further described below.

A rule execution engine may utilize the operational statistics collected by the container utility 502 to perform container tuning. Rules may correspond to observed situations that indicate likely overprovisioning or under provisioning resources for an application container. Some examples of possible rules for container tuning could be:

A rule that performs memory analysis on memory operational statistics to determine if memory headroom statistics exceed a first threshold (e.g., a 30% threshold) for a period of time, and if so, then a remedial action is recommended or automatically implemented to modify a manifest file with a reduced memory allocation for the application container. The reduced memory allocation may be set to a value that will result in subsequent headroom statistics that do not exceed the first threshold (e.g., a 20% memory headroom measurement). The manifest file may be used to redeploy the application container.

A rule that performs memory analysis on memory operational statistics to determine if memory headroom statistics is less than a second threshold (e.g., a 10% threshold) for a period of time, and if so, then a remedial action is recommended or automatically implemented to modify a manifest file with an increased memory allocation for the application container. The increased memory allocation may be set to a value that will result in subsequent headroom statistics that exceed the second threshold (e.g., a 20% memory headroom measurement). The manifest file may be used to redeploy the application container.

A rule that performs thread analysis on thread count statistics to determine whether an average thread count of threads executing in the application container is higher than 50 for a period of time, and if so, then a remedial action is recommended or automatically implemented to increase a CPU allocation to accommodate the extra processing needed for this level of executing threads.

A rule that evaluates memory usage by microservice applications, and sets memory allocations to 500 MB or less for containers hosting the microservice applications.

A rule that compares peak memory usage with a total allocation of memory to the container, and if the peak memory usage is less than 50% of the total allocation of memory (wasted resource that are allocated and not used), then a remedial action is recommended or automatically implemented to modify a manifest file with a decrease memory allocation for the application container.

A rule that evaluates a total time of garbage collection, and if the total time of garbage collection exceeds a threshold indicative of a memory misconfiguration or an out of memory (OOM) condition (a memory leak), then a remedial action is recommended or automatically implemented to modify a manifest file with a different memory allocation for the application container to reduce the garbage collection time.

A rule that evaluates a maximum average value of CPU usage during non-startup time, and automatically implements or recommends a remedial action to set a CPU limit to the maximum average value. This value may be set to be large enough so that the application can scale and handle burst processing.

These rules may be used to construct and implement remedial actions. In some implementations, the rule execution engine may provide an instruction for remedial action to the orchestration system. For example, in an automated system, the instruction may take the form of a modification to a configuration for containers used by the application, and/or an instruction to the orchestration system to terminate and re-deploy the container executing the application. Such instructions could be sent through an API exposed by the orchestration system. Additionally or alternatively, the instruction may take the form of a recommendation that is made available through a user interface, such that a system administrator may be aware that some remedial action has been taken or should be taken. In some embodiments of constructing a remedial action, if a memory request is set to a particular value, then a memory limit is set to that same value.

FIG. 10 provides an example of operational data collection, rule engine analysis and remedial action. In this example, the jstat tool is being used to monitor a Java application executing in a container in a common pod to the jstat tool. The container hosting the application has been instantiated using the configuration (yaml) manifest 1000, which indicates that the container has been allocated a memory resource limit of 350 MiB. The jstat tool is configured to collect garbage collection statistics associated with the JVM executing the application, at 1 second intervals. These statistics are provided to the service collector and stored in the data store for use by the rule execution engine. The rule execution engine runs a rule that determines that memory utilization by this application over a 5 second window is consistently below a threshold amount related to the size of its container—in this case the portion of unused memory (headroom) when memory usage is at its maximum is 65%, and the rule threshold for headroom is 30%. The rule generates a remedial action, which may include notifying a system administrator of this overprovisioning situation, as well as to modify the container configuration manifest to adjust the container memory allocation. In this case, the rule targets 80% application memory usage, so the adjustment is calculated to be 128 MiB (rounded up) based on the operational statistics. Configuration manifest 1010 is produced with the container memory limit adjusted to 128 MiB. In some implementations, the rule execution engine may also instruct the orchestrator to terminate and redeploy the application.

In some embodiments, the container utility 502 may be configured to monitor JVM workloads, python workloads, GoLang workloads, C workloads, and/or any other process, service, or application that is to be analyzed. In some embodiments, the container utility 502 (e.g., a sidecar) may be configured to run various utilities/tools that gather application and container metrics, such as using tools such as procps. The container utility 502 may implement additional metric collectors, such as Prometheus or New Relic, or as input to a "TICK" monitoring stack, in order to obtain overall performance metrics. The rule execution engine may implement rules to derive recommendations for these utilities/tools of the container utility 502 (e.g., sidecar utilities). In some implementations, a framework associated with the container utility 502 may allow for customized container utilities (custom sidecars) depending on a technology stack used by the application being monitored. For example, the container utility 502 may be implemented as a sidecar with monitors feeding a TICK stack that gathers statistics on GoLang applications. In each case, using the sidecar provides the ability to share the same process space with a target application without the application's knowledge of the sidecar.

Some examples of possible commands and utilities for collecting metrics could be:

A command: mem_usage=$(cat/sys/fs/cgroup/memory/memory.usage_in_bytes)

A command: mem_limit=$(cat/sys/fs/cgroup/memory/memory.limit_in_bytes)

A command: thread_count=$(cat/proc/<pid>/status|grep -i "thread:"|cut -d':' -f2)

A command: pid='ps -eaf|grep -m1 java|tr -s' '|cut -d' '-f2'

A command: cmdLine='cat/proc/<pid>/cmdline'

Figure 11:
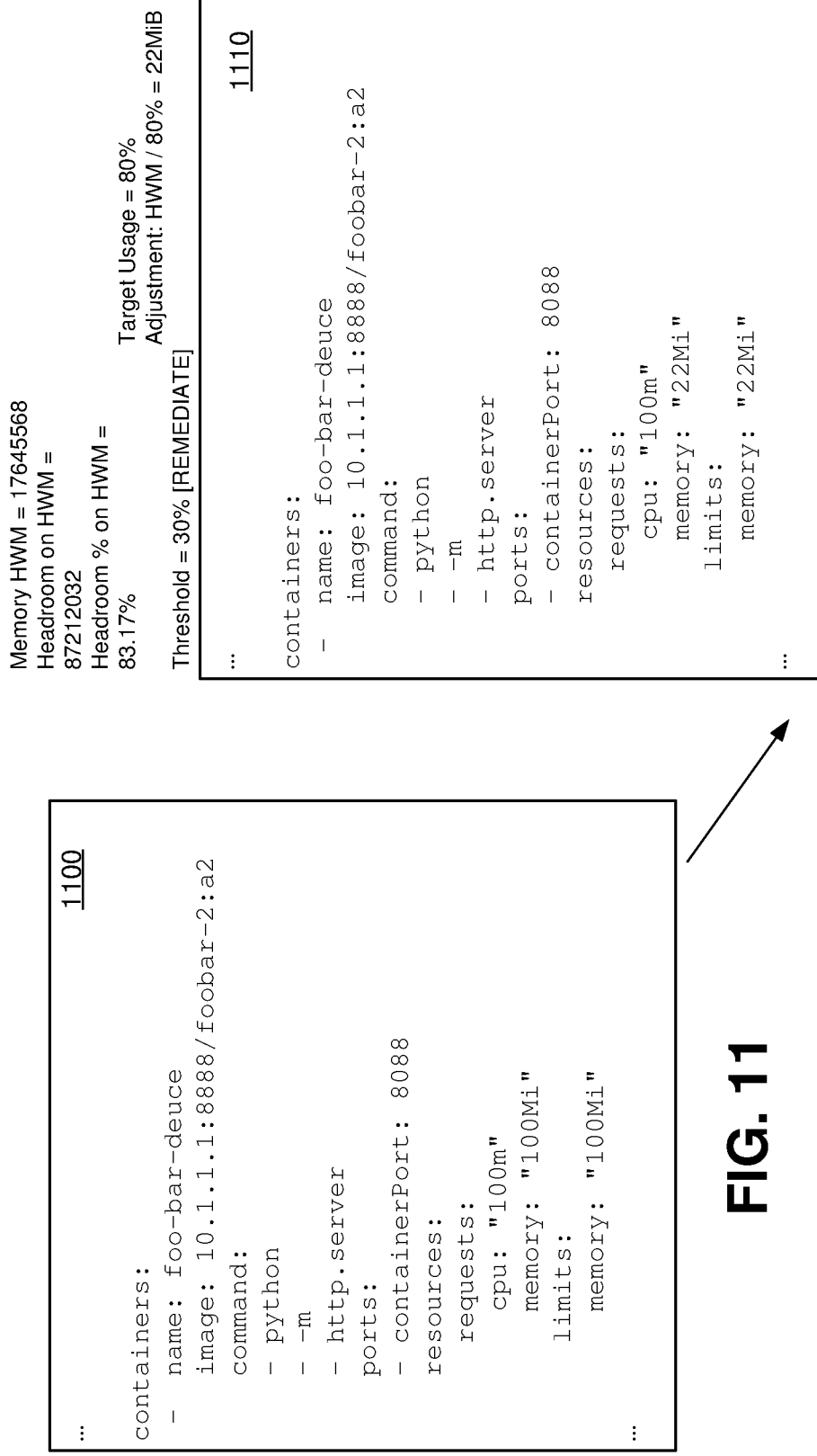
FIG. 11 is an example of operational data collection, rule engine analysis and remedial action.

FIG. 11 provides another example of operational data collection, rule engine analysis and remedial action. In this example, system process monitoring tools is being used to monitor a Python application executing in a container in a common pod to the container utility 502. The container hosting the Python application has been instantiated using the configuration (yaml) manifest 1100, which indicates that the container has been allocated a memory resource limit of 100 MiB. The container utility 502 may acquire usage statistics of the application on a periodic basis (such as every 1 second), and provide these statistics to the service collector for storage in the data store for use by the rule execution engine. In this example, the usage statistics indicate memory usage of 17473536 bytes and memory usage high-water mark (HWM) of 17645568 (determined over a window of time). These measurements result in a memory headroom calculation of 87212032 bytes. The rule execution engine runs a rule that determines that memory utilization by this application over a measurement window is consistently below a threshold amount related to the size of its container—in this case the headroom is 83% of allocated memory, and the rule threshold for headroom is 30%. The rule generates a remedial action, which may include notifying a system administrator of this overprovisioning situation, as well as to modify the container configuration manifest to adjust the container memory allocation. In this case, the rule targets 80% application memory usage, so the adjustment is calculated to be 22 MiB (rounded up) based on the operational statistics. Configuration manifest 1110 is produced with the container memory limit adjusted to 22 MiB. This adjustment provides a 78% improvement in memory usage. In some implementations, the rule execution engine may also instruct the orchestrator to terminate and redeploy the application using the modified deployment configuration.

According to some embodiments, a method may be provided. The method includes hosting an application within a container managed by a pod of a container hosting environment. The method includes hosting a container utility in the pod to collect operational statistics of the application executing within the container. The method includes acquiring, by a service collector hosted within the container hosting environment, the operational statistics of the application. The method includes executing, by a rule execution engine hosted within the container hosting environment, a set of rules to process the operational statistics. The method includes in response to the set of rules identifying suboptimal operation of the application, creating a remedial action to address the suboptimal operation of the application. The method includes executing the remedial action to modify a configuration used to deploy and manage the application by the pod to create a modified configuration. The method includes re-deploying the pod for re-hosting the application through the container hosting environment utilizing the modified configuration.

According to some embodiments, the method includes modifying at least one of a cluster configuration, a namespace configuration, a pod configuration, or a container configuration as the configuration to create the modified configuration.

According to some embodiments, the method includes generating a recommendation to modify application code of the application to address the suboptimal operation of the application.

According to some embodiments, the method includes generating a recommendation for configuration refactoring of resource consumption and allocation of the application to address the suboptimal operation of the application.

According to some embodiments, the method includes implementing retry logic to retry the execution of the remedial action based upon a failure.

According to some embodiments, the method includes utilizing a machine learning model to create the remedial action based upon output from the set of rules indicating the suboptimal operation of the application.

According to some embodiments, the method includes evaluating an impact of executing the remedial action to determine whether to execute the remedial action or to generate a recommendation based upon the remedial action.

According to some embodiments, the method includes utilizing a machine learning model to perform historic trend analysis upon operational statistics collected over a time period for the application; and generating a recommendation for the container, a namespace, or a cluster including the pod based upon the historic trend analysis.

According to some embodiments, the method includes executing the rule set to evaluate the operational statistics of the application utilizing a memory rule.

According to some embodiments, the method includes executing the rule set to evaluate the operational statistics of the application utilizing a thread rule.

According to some embodiments, the method includes executing the rule set to evaluate the operational statistics of the application utilizing a storage rule.

According to some embodiments, the method includes executing the rule set to evaluate the operational statistics of the application utilizing at least one of a pod usage rule, a pod startup rule, a cluster usage rule, a namespace usage rule, or an autoscaling rule.

According to some embodiments, the method includes polling, by the service collector, the operational statistics from the container utility.

According to some embodiments, the method includes pushing, by the container utility, the operational statistics to the service collector.

According to some embodiments, a computing device is provided. The computing device comprises a memory comprising instructions; and a processor coupled to the memory, the processor configured to execute the instructions to facilitate performance of operations comprising: hosting an application within a container managed by a pod of a container hosting environment; hosting a container utility in the pod to collect operational statistics of the application executing within the container; acquiring, by a service collector hosted within the container hosting environment, the operational statistics of the application; executing, by a rule execution engine hosted within the container hosting environment, a set of rules to process the operational statistics; in response to the set of rules identifying suboptimal operation of the application, creating a recommendation to address the suboptimal operation of the application; and transmitting the recommendation to a device for implementing the recommendation to address the suboptimal operation of the application.

According to some embodiments, the operations include identifying the suboptimal operation corresponding an amount of unused memory resources assigned to the pod for hosting the application.

According to some embodiments, the operations include identifying the suboptimal operation corresponding an amount of unused thread or CPU resources assigned to the pod for hosting the application.

According to some embodiments, a non-transitory computer-readable medium storing instructions that when executed facilitate performance of operations, is provided. The operations include acquiring, by a service collector hosted within a container hosting environment, operational statistics of an application hosted within a container managed by a pod of the container hosting environment; executing, by a rule execution engine hosted within the container hosting environment, a set of rules to process the operational statistics; in response to the set of rules identifying suboptimal operation of the application, creating a remedial action to address the suboptimal operation of the application; executing the remedial action to modify a configuration used to deploy and manage the application by the pod to create a modified configuration; and re-deploying the pod for re-hosting the application through the container hosting environment utilizing the modified configuration.

According to some embodiments, the operations include modifying resource and limit parameters within the configuration to create the modified configuration.

According to some embodiments, the operations include in response to detecting degraded performance of the application after re-deployment of the pod, rolling back the modifications of the modified configuration to perform a subsequent redeployment of the pod.

Figure 6:
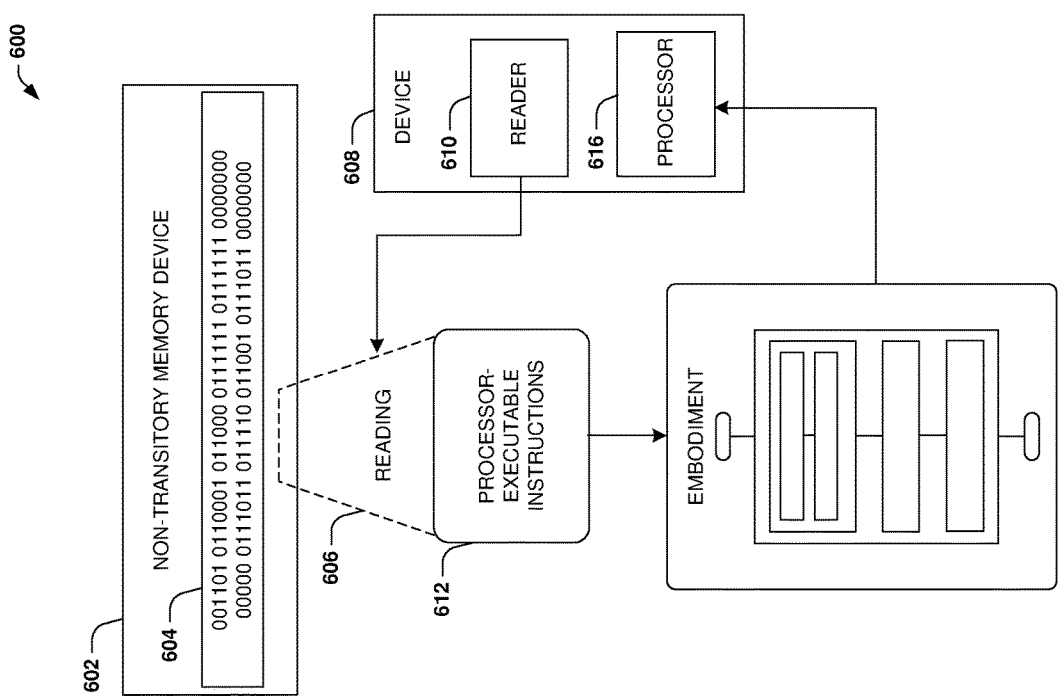
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein. The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed cause performance of operations, such as at least some of the example method 200 of FIG. 2, for example. In some embodiments, the processor-executable instructions 612 are configured to cause implementation of a system, such as at least some of the example system 100 of FIG. 1, at least some of the example system 300 of FIGS. 3A and 3B, at least some of the example system 400 of FIGS. 4A-4E, and/or at least some of the example system 500 of FIG. 5.

Figure 7:
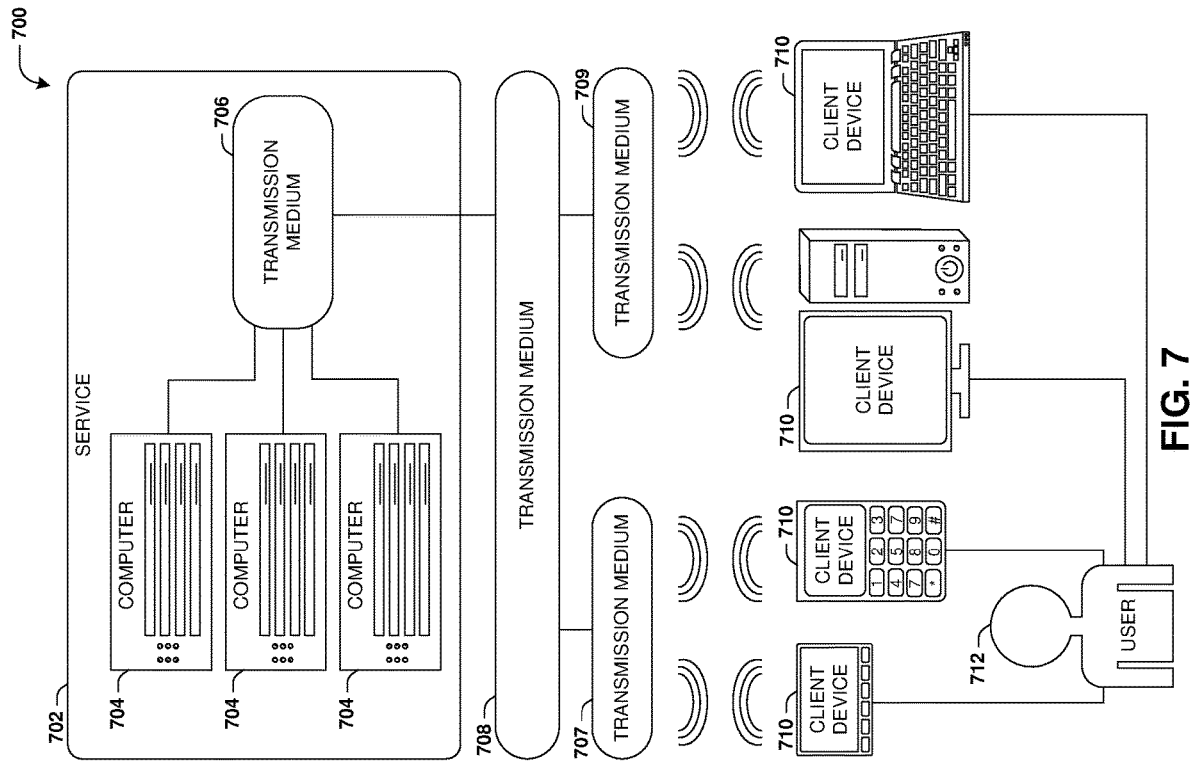
FIG. 7 is an illustration of example networks that may utilize and/or implement at least a portion of the techniques presented herein.

FIG. 7 is an interaction diagram of a scenario 700 illustrating a service 702 provided by a set of computers 704 to a set of client devices 710 via various types of transmission mediums. The computers 704 and/or client devices 710 may be capable of transmitting, receiving, processing, and/or storing many types of signals, such as in memory as physical memory states.

The computers 704 of the service 702 may be communicatively coupled together, such as for exchange of communications using a transmission medium 706. The transmission medium 706 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 702.

Likewise, the transmission medium 706 may comprise one or more sub-networks, such as may employ different architectures, may be compliant or compatible with differing protocols and/or may interoperate within the transmission medium 706. Additionally, various types of transmission medium 706 may be interconnected (e.g., a router may provide a link between otherwise separate and independent transmission medium 706).

In scenario 700 of FIG. 7, the transmission medium 706 of the service 702 is connected to a transmission medium 708 that allows the service 702 to exchange data with other services 702 and/or client devices 710. The transmission medium 708 may encompass various combinations of devices with varying levels of distribution and exposure, such as a public wide-area network and/or a private network (e.g., a virtual private network (VPN) of a distributed enterprise).

In the scenario 700 of FIG. 7, the service 702 may be accessed via the transmission medium 708 by a user 712 of one or more client devices 710, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 710 may communicate with the service 702 via various communicative couplings to the transmission medium 708. As a first such example, one or more client devices 710 may comprise a cellular communicator and may communicate with the service 702 by connecting to the transmission medium 708 via a transmission medium 707 provided by a cellular provider. As a second such example, one or more client devices 710 may communicate with the service 702 by connecting to the transmission medium 708 via a transmission medium 709 provided by a location such as the user's home or workplace (e.g., a WiFi (Institute of Electrical and Electronics Engineers (IEEE) Standard 702.11) network or a Bluetooth (IEEE Standard 702.15.1) personal area network). In this manner, the computers 704 and the client devices 710 may communicate over various types of transmission mediums.

Figure 8:
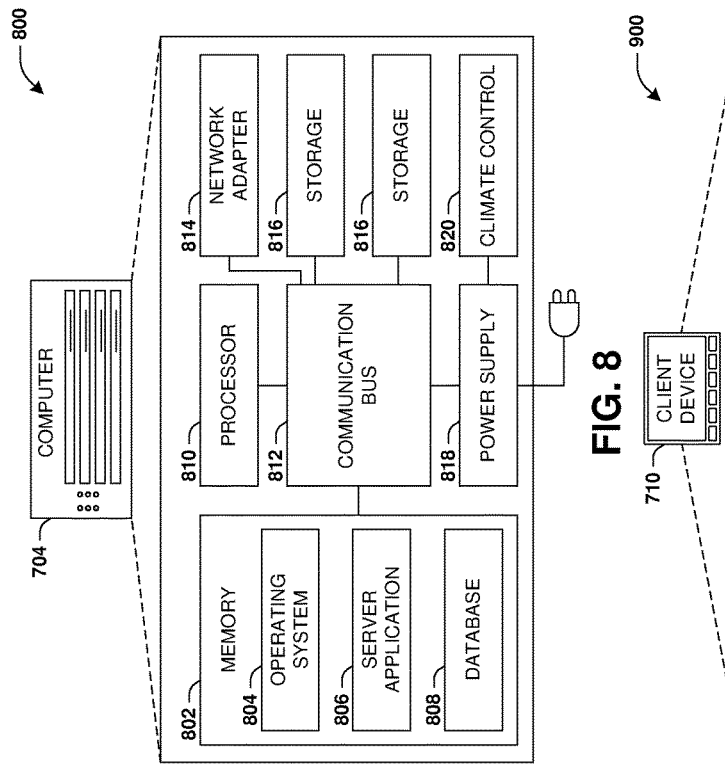
FIG. 8 is an illustration of a scenario involving an example configuration of a computer that may utilize and/or implement at least a portion of the techniques presented herein.

FIG. 8 presents a schematic architecture diagram 800 of a computer 704 that may utilize at least a portion of the techniques provided herein. Such a computer 704 may vary widely in configuration or capabilities, alone or in conjunction with other computers, in order to provide a service such as the service 702.

The computer 704 may comprise one or more processors 810 that process instructions. The one or more processors 810 may optionally include a plurality of cores; one or more coprocessors, such as a mathematics coprocessor or an integrated graphical processing unit (GPU); and/or one or more layers of local cache memory. The computer 704 may comprise memory 802 storing various forms of applications, such as an operating system 804; one or more computer applications 806; and/or various forms of data, such as a database 808 or a file system. The computer 704 may comprise a variety of peripheral components, such as a wired and/or wireless network adapter 814 connectible to a local area network and/or wide area network; one or more storage components 816, such as a hard disk drive, a solid-state storage device (SSD), a flash memory device, and/or a magnetic and/or optical disk reader.

The computer 704 may comprise a mainboard featuring one or more communication buses 812 that interconnect the processor 810, the memory 802, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 812 may interconnect the computer 704 with at least one other computer. Other components that may optionally be included with the computer 704 (though not shown in the schematic architecture diagram 800 of FIG. 8) include a display; a display adapter, such as a graphical processing unit (GPU); input peripherals, such as a keyboard and/or mouse; and a flash memory device that may store a basic input/output system (BIOS) routine that facilitates booting the computer 704 to a state of readiness.

The computer 704 may operate in various physical enclosures, such as a desktop or tower, and/or may be integrated with a display as an "all-in-one" device. The computer 704 may be mounted horizontally and/or in a cabinet or rack, and/or may simply comprise an interconnected set of components. The computer 704 may comprise a dedicated and/or shared power supply 818 that supplies and/or regulates power for the other components. The computer 704 may provide power to and/or receive power from another computer and/or other devices. The computer 704 may comprise a shared and/or dedicated climate control unit 820 that regulates climate properties, such as temperature, humidity, and/or airflow. Many such computers 704 may be configured and/or adapted to utilize at least a portion of the techniques presented herein.

Figure 9:
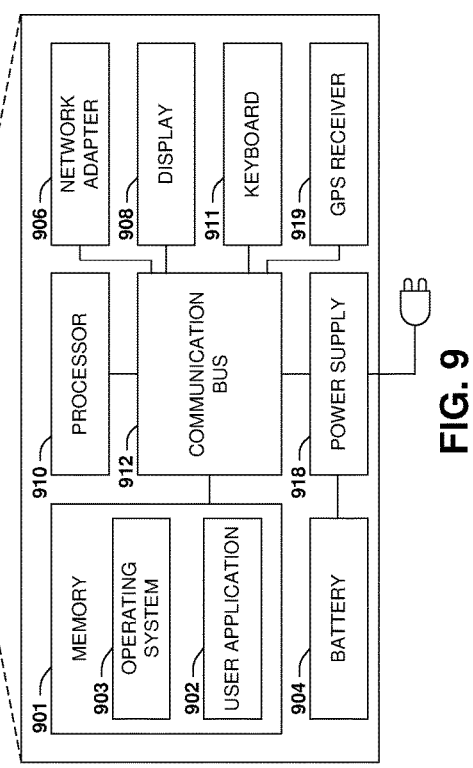
FIG. 9 is an illustration of a scenario involving an example configuration of a client that may utilize and/or implement at least a portion of the techniques presented herein.

FIG. 9 presents a schematic architecture diagram 900 of a client device 710 whereupon at least a portion of the techniques presented herein may be implemented. Such a client device 710 may vary widely in configuration or capabilities, in order to provide a variety of functionality to a user such as the user 712. The client device 710 may be provided in a variety of form factors, such as a desktop or tower workstation; an "all-in-one" device integrated with a display 908; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 710 may serve the user in a variety of roles, such as a workstation, kiosk, media player, gaming device, and/or appliance.

The client device 710 may comprise one or more processors 910 that process instructions. The one or more processors 910 may optionally include a plurality of cores; one or more coprocessors, such as a mathematics coprocessor or an integrated graphical processing unit (GPU); and/or one or more layers of local cache memory. The client device 710 may comprise memory 901 storing various forms of applications, such as an operating system 903; one or more user applications 902, such as document applications, media applications, file and/or data access applications, communication applications such as web browsers and/or email clients, utilities, and/or games; and/or drivers for various peripherals. The client device 710 may comprise a variety of peripheral components, such as a wired and/or wireless network adapter 906 connectible to a local area network and/or wide area network; one or more output components, such as a display 908 coupled with a display adapter (optionally including a graphical processing unit (GPU)), a sound adapter coupled with a speaker, and/or a printer; input devices for receiving input from the user, such as a keyboard 911, a mouse, a microphone, a camera, and/or a touch-sensitive component of the display 908; and/or environmental sensors, such as a global positioning system (GPS) receiver 919 that detects the location, velocity, and/or acceleration of the client device 710, a compass, accelerometer, and/or gyroscope that detects a physical orientation of the client device 710. Other components that may optionally be included with the client device 710 (though not shown in the schematic architecture diagram 900 of FIG. 9) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 710 to a state of readiness; and a climate control unit that regulates climate properties, such as temperature, humidity, and airflow.

The client device 710 may comprise a mainboard featuring one or more communication buses 912 that interconnect the processor 910, the memory 901, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 710 may comprise a dedicated and/or shared power supply 918 that supplies and/or regulates power for other components, and/or a battery 904 that stores power for use while the client device 710 is not connected to a power source via the power supply 918. The client device 710 may provide power to and/or receive power from other client devices.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed:

1. A method, comprising:
hosting an application within a container managed by a pod of a container hosting environment, wherein the pod deploys and manages the application using a deployment manifest indicative of at least one of a resource allocation for the container, a limit for the container or a parameter for the container;
hosting a container utility in the pod to collect operational statistics of the application executing within the container;
acquiring, by a service collector hosted within the container hosting environment, the operational statistics of the application executing within the container, wherein the operational statistics are indicative of resource consumption by the application in relation to at least one of one or more resource allocations or one or more limits applied to the container for the application;
executing, by a rule execution engine hosted within the container hosting environment, a set of rules to process the operational statistics of the application executing within the container;
in response to execution of the set of rules causing the rule execution engine to identify suboptimal operation of the application executing within the container managed by the pod, determining a remedial action to address the suboptimal operation of the application executing within the container managed by the pod, wherein the determining the remedial action comprises at least one of:
  determining to modify the deployment manifest with a reduced memory allocation for the container if memory analysis performed on the operational statistics indicates that memory headroom statistics exceed a first threshold for a first period of time;
  determining to modify the deployment manifest with an increased memory allocation for the container if memory analysis performed on the operational statistics indicates that memory headroom statistics is less than a second threshold for a second period of time;
  determining to increase a central processing unit (CPU) allocation to accommodate extra processing needed for a level of executing threads if thread analysis performed on the operational statistics indicates that an average thread count of threads executing in the container is higher than a first value for a third period of time;
  determining to set memory allocations to a second value for one or more containers hosting one or more microservice applications upon evaluating memory usage by the one or more microservice applications;
  determining to modify the deployment manifest with a decrease memory allocation for the container if comparing peak memory usage with a total allocation of memory to the container indicates that the peak memory usage is less than a first percentage of the total allocation of memory;
  determining to modify the deployment manifest with a different memory allocation for the container to reduce garbage collection time if evaluation of a total time of garbage collection indicates that the total time of garbage collection exceeds a third threshold and is indicative of at least one of a memory misconfiguration or an out of memory (OOM) condition; or determining to set a CPU limit to a maximum average value of CPU usage during non-startup time to be large enough so that the application can scale and handle burst processing;

in response to creating the remedial action, automatically executing the remedial action to perform container tuning by modifying the deployment manifest to create a modified deployment manifest indicative of at least one of a second resource allocation for the container, a second limit for the container or a second parameter for the container; and re-deploying the pod for re-hosting the application through the container hosting environment utilizing the modified deployment manifest.

2. The method of claim 1, comprising:
modifying at least one of a cluster configuration, a namespace configuration, a pod configuration, or a container configuration as the deployment manifest to create the modified deployment manifest.

3. The method of claim 1, comprising:
generating a recommendation to modify application code of the application to address the suboptimal operation of the application.

4. The method of claim 1, comprising:
generating a recommendation for configuration refactoring of resource consumption and allocation of the application to address the suboptimal operation of the application.

5. The method of claim 1, comprising:
implementing retry logic to retry the execution of the remedial action based upon a failure.

6. The method of claim 1, comprising:
utilizing a machine learning model to create the remedial action based upon output from the set of rules indicating the suboptimal operation of the application.

7. The method of claim 1, wherein the determining the remedial action comprises determining to modify the deployment manifest with the reduced memory allocation for the container in response to memory analysis performed on the operational statistics indicating that memory headroom statistics exceed the first threshold for the first period of time.

8. The method of claim 1, comprising:
utilizing a machine learning model to perform historic trend analysis upon operational statistics collected over a time period for the application; and
generating a recommendation for the container, a namespace, or a cluster including the pod based upon the historic trend analysis.

9. The method of claim 1, wherein the determining the remedial action comprises determining to modify the deployment manifest with the increased memory allocation for the container in response to memory analysis performed on the operational statistics indicating that memory headroom statistics is less than the second threshold for the second period of time.

10. The method of claim 1, wherein the determining the remedial action comprises determining to increase the CPU allocation to accommodate extra processing needed for the level of executing threads in response to thread analysis performed on the operational statistics indicating that the average thread count of threads executing in the container is higher than the first value for the third period of time.

11. The method of claim 1, wherein the determining the remedial action comprises determining to set memory allocations to the second value for the one or more containers hosting the one or more microservice applications upon evaluating memory usage by the one or more microservice applications.

12. The method of claim 1, wherein the determining the remedial action comprises determining to modify the deployment manifest with the decrease memory allocation for the container in response to comparing peak memory usage with the total allocation of memory to the container indicating that the peak memory usage is less than the first percentage of the total allocation of memory.

13. The method of claim 1, wherein the determining the remedial action comprises determining to modify the deployment manifest with the different memory allocation for the container to reduce garbage collection time in response to evaluation of the total time of garbage collection indicating that the total time of garbage collection exceeds the third threshold and is indicative of at least one of the memory misconfiguration or the OOM condition.

14. The method of claim 1, wherein the determining the remedial action comprises determining to set the CPU limit to the maximum average value of CPU usage during non-startup time to be large enough so that the application can scale and handle burst processing.

15. A computing device comprising:
a memory comprising instructions; and
a processor coupled to the memory, the processor configured to execute the instructions to facilitate performance of operations comprising:
hosting an application within a container managed by a pod of a container hosting environment, wherein the pod deploys and manages the application using a configuration indicative of at least one of a resource allocation for the container, a limit for the container or a parameter for the container;
hosting a container utility in the pod to collect operational statistics of the application executing within the container;
acquiring, by a service collector hosted within the container hosting environment, the operational statistics of the application executing within the container;
executing, by a rule execution engine hosted within the container hosting environment, a set of rules to process the operational statistics of the application executing within the container;
in response to execution of the set of rules causing the rule execution engine to identify suboptimal operation of the application executing within the container managed by the pod, creating a recommendation to address the suboptimal operation of the application executing within the container managed by the pod, wherein the creating the recommendation comprises at least one of:
recommending to modify a deployment manifest with a reduced memory allocation for the container if memory analysis performed on the operational statistics indicates that memory headroom statistics exceed a first threshold for a first period of time;
recommending to modify the deployment manifest with an increased memory allocation for the container if memory analysis performed on the operational statistics indicates that memory headroom statistics is less than a second threshold for a second period of time;
recommending to increase a central processing unit (CPU) allocation to accommodate extra processing needed for a level of executing threads if thread analysis performed on the operational statistics indicates that an average thread count of threads executing in the container is higher than a first value for a third period of time;

recommending to set memory allocations to a second value for one or more containers hosting one or more microservice applications upon evaluating memory usage by the one or more microservice applications;

recommending to modify the deployment manifest with a decrease memory allocation for the container if comparing peak memory usage with a total allocation of memory to the container indicates that the peak memory usage is less than a first percentage of the total allocation of memory;

recommending to modify the deployment manifest with a different memory allocation for the container to reduce garbage collection time if evaluation of a total time of garbage collection indicates that the total time of garbage collection exceeds a third threshold and is indicative of at least one of a memory misconfiguration or an out of memory (OOM) condition; or recommending to set a CPU limit to a maximum average value of CPU usage during non-startup time to be large enough so that the application can scale and handle burst processing; and transmitting the recommendation to a device for implementing the recommendation to address the suboptimal operation of the application.

16. The computing device of claim 15, wherein the operations comprise:

identifying the suboptimal operation corresponding an amount of unused memory resources assigned to the pod for hosting the application.

17. The computing device of claim 15, wherein the operations comprise:

identifying the suboptimal operation corresponding an amount of unused thread or CPU resources assigned to the pod for hosting the application.

18. A non-transitory computer-readable medium storing instructions that when executed facilitate performance of operations comprising:

acquiring, by a service collector hosted within a container hosting environment, operational statistics of an application hosted within a container managed by a pod of the container hosting environment, wherein the pod deploys and manages the application using a configuration indicative of at least one of a resource allocation for the container, a limit for the container or a parameter for the container;

executing, by a rule execution engine hosted within the container hosting environment, a set of rules to process the operational statistics of the application executing within the container;

in response to execution of the set of rules causing the rule execution engine to identify suboptimal operation of the application executing within the container managed by the pod, determining a remedial action to address the suboptimal operation of the application executing within the container managed by the pod, wherein the determining the remedial action comprises at least one of:

determining to modify a deployment manifest with a reduced memory allocation for the container if memory analysis performed on the operational statistics indicates that memory headroom statistics exceed a first threshold for a first period of time;

determining to modify the deployment manifest with an increased memory allocation for the container if memory analysis performed on the operational statistics indicates that memory headroom statistics is less than a second threshold for a second period of time;

determining to increase a central processing unit (CPU) allocation to accommodate extra processing needed for a level of executing threads if thread analysis performed on the operational statistics indicates that an average thread count of threads executing in the container is higher than a first value for a third period of time;

determining to set memory allocations to a second value for one or more containers hosting one or more microservice applications upon evaluating memory usage by the one or more microservice applications;

determining to modify the deployment manifest with a decrease memory allocation for the container if comparing peak memory usage with a total allocation of memory to the container indicates that the peak memory usage is less than a first percentage of the total allocation of memory;

determining to modify the deployment manifest with a different memory allocation for the container to reduce garbage collection time if evaluation of a total time of garbage collection indicates that the total time of garbage collection exceeds a third threshold and is indicative of at least one of a memory misconfiguration or an out of memory (OOM) condition; or determining to set a CPU limit to a maximum average value of CPU usage during non-startup time to be large enough so that the application can scale and handle burst processing;

in response to creating the remedial action, automatically executing the remedial action to modify the configuration to create a modified configuration indicative of at least one of a second resource allocation for the container, a second limit for the container or a second parameter for the container; and re-deploying the pod for re-hosting the application through the container hosting environment utilizing the modified configuration.

19. The non-transitory computer-readable medium of claim 18, wherein the operations comprise:

modifying resource and limit parameters within the configuration to create the modified configuration.

20. The non-transitory computer-readable medium of claim 18, wherein the operations comprise:

in response to detecting degraded performance of the application after re-deployment of the pod, rolling back the modifications of the modified configuration to perform a subsequent redeployment of the pod.

* * * * *